United States Patent [19]
Nakazawa et al.

[11] Patent Number: 6,164,731
[45] Date of Patent: Dec. 26, 2000

[54] AUTOMOTIVE BRAKE SYSTEM

[75] Inventors: Chiharu Nakazawa, Kawasaki; Yukinori Otsuka; Yukio Sudo, both of Kanagawa, all of Japan

[73] Assignee: Unisia Jecs Corporation, Atsugi, Japan

[21] Appl. No.: 09/116,605

[22] Filed: Jul. 17, 1998

[30] Foreign Application Priority Data

Jul. 17, 1997 [JP] Japan ................................ 9-192749

[51] Int. Cl.⁷ .................................................. B60T 8/40
[52] U.S. Cl. .................................... 303/116.1; 303/116.4; 303/10; 303/DIG. 10
[58] Field of Search ........................ 303/140, 10, 11, 303/113.1, 113.2, 116.1, 116.2, 116.4, 119.1, DIG. 10, DIG. 11

[56] References Cited

U.S. PATENT DOCUMENTS

| | | | |
|---|---|---|---|
| 4,641,895 | 2/1987 | Belart et al. | 303/119.1 |
| 5,207,485 | 5/1993 | Troster | 303/113.2 |
| 5,407,257 | 4/1995 | Iwata | 303/113.2 |
| 5,466,055 | 11/1995 | Schmitt et al. | 303/116.4 |
| 5,577,813 | 11/1996 | Zaviska | 303/116.4 |
| 5,593,216 | 1/1997 | Hosoya et al. | 303/116.4 |
| 5,938,296 | 8/1999 | Nakazawa | 303/113.2 |
| 5,992,944 | 11/1999 | Hara | 303/116.1 |
| 6,010,198 | 1/2000 | Nakazawa | 303/113.1 |

FOREIGN PATENT DOCUMENTS

| | | |
|---|---|---|
| 7-501506 | 2/1995 | Japan . |
| 94/07720 | 4/1994 | WIPO . |

*Primary Examiner*—Matthew C. Graham
*Assistant Examiner*—Mariano Sy
*Attorney, Agent, or Firm*—Foley & Lardner

[57] ABSTRACT

An automotive brake system comprises a sump fluidly disposed in a housing, constructing a brake unit, and in the middle of a suction circuit of a pressure apply device including at least a pressure apply pump. During vehicle dynamics control or during vehicle stability control, the pressure apply rapidly sucks the brake fluid stored in the sump and quickly performs a pressure apply action, irrespective of the distance between the brake unit and a brake-fluid source. This ensures a smooth brake-fluid supply to the suction circuit of a return pump returning the brake fluid from the wheel-brake cylinder to the brake circuit upstream of a fluid-pressure control valve unit.

8 Claims, 4 Drawing Sheets

AUTOMOTIVE BRAKE SYSTEM

BACKGROUND OF THE INVENTION

1. Field of the Invention

The present invention relates to an automotive brake system capable of actively adjusting vehicle stability by a computer-controlled braking force, and specifically to a computer-controlled automotive braking system equipped with at least a skid control unit involving a hydraulic pump for suppressing a so-called deceleration slip which may often occur during braking on low-$\mu$ roads, and a traction and vehicle dynamics control unit involving another hydraulic pump for suppressing a so-called acceleration slip which may often occur when rapidly accelerating and/or for actively producing a proper yawing moment necessary to improve vehicle stability or vehicle dynamics (e.g., cornering stability or steer characteristics) by virtue of a computer-controlled wheel-brake cylinder pressure (or a computer-controlled braking force).

2. Description of the Prior Art

Recently, there have been proposed and developed various computer-controlled brake systems equipped with a skid control unit (often called an "ABS unit" or an "ABS hydraulic unit") which is designed to prevent skidding and thus provide maximum effective braking, and/or a traction and vehicle dynamics control unit substantially corresponding to a "traction-and-yaw control unit". In such a conventional computer-controlled brake system having an ABS unit and a traction-and-yaw control unit, the ABS unit includes a plurality of fluid pressure control valves and a return pump (an ABS pump) for skid control. On the other hand, the traction-and-yaw control unit generally includes a brake-fluid pressure apply pump serving to rise a wheel-brake cylinder pressure during the traction control or during the vehicle dynamics control (yaw control). On more later-model hydraulic brake system with an ABS unit and a traction-and-yaw control hydraulic unit, a brake-fluid pressure apply piston is further disposed between the brake-fluid pressure apply pump and each brake circuit of a dual-brake system to indirectly supply the brake-fluid pressure via the pressure apply piston unit. One such computer-controlled brake system, which is applicable to skid control and vehicle stability control, has been disclosed in an international application No. PCT/DE93/00802, filed Sep. 4, 1993 (PCT publication No. WO 94/07720, published Apr. 14, 1994), corresponding to Japanese patent publication No. 7-501506, published Feb. 16, 1995. The hydraulic brake system disclosed in the international patent application No. PCT/DE93/00802, has a plurality of fluid pressure control valves fluidly disposed in the hydraulic brake circuit and comprised of inflow valves and outflow valves, and an ABS unit having a return pump (or an ABS pump) which is driven during skid control to brake fluid drained from the outflow valves toward upstream of the fluid pressure control valves (that is, toward the master-cylinder side). Additionally, a suction circuit is connected via a normally-closed inflow gate valve to the suction side of the return pump. A normally-open outflow gate valve is disposed upstream of the discharge outlet of the return pump. Also, the prior art brake system disclosed in the international patent application No. PCT/DE93/00802, has a pressure apply piston in the brake circuit upstream of the outflow gate valve, and a pressure apply pump which sucks brake fluid from the reservoir of the master cylinder and supplies the brake fluid into the suction side of the return pump during the traction-and-yaw control. The pressure apply piston unit has a piston which is slidably accommodated in a piston cylinder and divides an internal space of the cylinder into a primary chamber and a secondary chamber. The primary chamber communicates with the discharge port of the pressure apply pump, whereas the secondary chamber is connected to the suction circuit. The pressure apply piston unit further comprises a communication passageway intercommunicating the upstream side and downstream side of the brake circuit. In the previously-noted conventional brake system, when the depression of the brake pedal produces the master-cylinder pressure, the master-cylinder pressure is transmitted via the communication passageway of the pressure apply piston unit and then transmitted through the brake circuit to the wheel-brake cylinder. This produces a braking force. During braking, if there is a greatly increased tendency of wheel lock, the skid control is initiated by means of the ABS unit. During the skid control, the return pump (ABS pump) is driven and simultaneously the fluid-pressure control valves are operated according to a proper skid control cycle, namely a pressure-reduction mode, a pressure-hold mode, and a pressure build-up mode, in order to prevent undesired wheel lock. When the vehicle excessive understeer or excessive oversteer during cornering, the computer-controlled brake system executes the vehicle dynamics control, to generate a yawing moment counteracting the undesired vehicle behavior or undesired yaw rotation about the z-axis by producing a braking force at each of properly selected road wheels. In the conventional brake system, during the vehicle dynamics control, the outflow gate valve is fully closed, whereas the inflow gate valve is fully opened. At the same time, the return pump and the pressure apply pump are both driven. Thus, the brake fluid in the reservoir located on the master cylinder is supplied to the primary chamber of the pressure apply piston unit by way of the pressure apply pump, and thus the piston of the pressure apply piston unit slides axially, and applies pressure to the brake fluid in the secondary chamber. This pressure forces the brake fluid in the secondary chamber into the suction circuit of the return pump. Then, the return pump sucks the brake fluid supplied into the suction circuit and then discharges it into the brake circuit. The respective fluid-pressure control valve is provided to properly regulate the brake-fluid pressure pumped from the return pump and to feed the regulated brake-fluid pressure to the associated wheel-brake cylinder. The above-noted conventional brake system suffers from the following drawbacks. That is, during the vehicle dynamics control, a proper brake-fluid pressure must be fed to the wheel-brake cylinder for an excessively brief time. For this reason, the conventional brake system is designed so that the brake fluid is fed into the suction side of the return pump by way of the pumping action of the pressure apply pump. By virtue of the pressure-apply action of the pressure apply pump and piston unit, the brake fluid can be discharged toward the wheel-brake cylinder for an excessively short time. This enhances the responsiveness of the computer-controlled brake system. However, in the conventional brake system, a pressure apply pump, a return pump, an inflow gate valve, and outflow gate valve, and fluid-pressure control valves are formed integral with each other in the same housing and constructed as a unit. In order for the pressure apply pump to suck brake fluid from the reservoir of the master cylinder for a brief time, the conventional system has a considerably reduced, limited lay-out flexibility, because such a hydraulic unit must be located at a position as close to the master cylinder as possible, to provide a smooth pressure-apply action and to ensure a high responsiveness of the system operation. On the contrary, in due consideration of mutual installation relationship between such a hydraulic unit and other devices/ units in the engine room, it is desirable that this hydraulic unit is located away from the reservoir of the master cylinder. In this case, it takes a long time until the pressure apply pump sucks a required amount of brake fluid necessary for a proper pressure apply action and pumps the brake fluid into the inlet side of the return pump. This reduces the responsiveness of the system operation. Such a reduced system responsibility is remarkable during cold weathers. As discussed above, in the conventional system, it is difficult to balance these two contradictory requirements, that is, a high responsiveness in the system and an enhanced lay-out flexibility. To balance the two contradictory requirements, it is possible to install only the pressure apply pump and piston unit near the master cylinder as a separated hydraulic unit. This increases the number of component parts or the number of units, and thus results in the increase in production costs. Also, this lowers the efficiency of installation of the hydraulic unit on the vehicle and thus reduces the productivity of the brake system.

SUMMARY OF THE INVENTION

Accordingly, it is an object of the invention to provide an automotive brake system which avoids the aforementioned disadvantages of the prior art.

It is another object of the invention, to balance two contradictory requirements, that is, an enhanced mounting performance of a computer-controlled hydraulic brake system on an automotive vehicle and an enhanced lay-out flexibility of the computer-controlled hydraulic brake system, without increasing production costs and without sacrificing the productivity of a hydraulic unit included in the brake system.

In order to accomplish the aforementioned and other objects of the present invention, an automotive brake system comprises a fluid-pressure generating device for generating a brake fluid pressure based on a magnitude of depression of a brake pedal, a wheel-brake cylinder being adapted to be attached to a road wheel for generating a braking force applied to the road wheel, a brake circuit connected between the fluid-pressure generating device and the wheel-brake cylinder, a hydraulic brake unit comprising a housing, a fluid-pressure control valve unit fluidly disposed in the brake circuit and responsive to a control signal for operating at a selected one of three operating modes comprising a pressure reduction mode, a pressure-hold mode, and a pressure build-up mode to reduce, hold, and build up a wheel-cylinder pressure of the wheel-brake cylinder, a reservoir connected to a return line for temporarily storing brake fluid drained from the wheel-brake cylinder during the pressure reduction mode of the fluid-pressure control valve unit, a return pump operated in response to a control signal for returning the brake fluid stored in the reservoir via the return line to the brake circuit upstream of the fluid-pressure control valve unit, a pressure apply pump whose outlet is connected via a pressure apply circuit to a suction circuit of the return pump, the pressure apply pump operated in response to a control signal for performing a pressure apply action, so that the pressure apply pump sucks the brake fluid from a brake fluid source via a pressure apply suction circuit and discharges the brake fluid into a pressure apply discharge circuit, and thus supplies the brake fluid via the pressure apply circuit into the suction circuit, a first gate valve disposed in the brake circuit between a discharge port of the return pump and the fluid-pressure generating device and operated in response to a control signal for opening and closing the brake circuit, a second gate valve disposed in the pressure apply circuit and operated in response to a control signal for opening and closing the pressure apply circuit, and the fluid-pressure control valve unit, the reservoir, the return pump, the pressure apply pump, the first and second gate valves being integrally accommodated in the housing. Also provided is a control unit generating the control signals respectively transmitted to the fluid-pressure control valve unit, the return pump, the pressure apply pump, and the first and second gate valves, for executing at least vehicle dynamics control, so that, during the vehicle dynamics control, the second gate valve is opened, the first gate valve is closed, the return pump and the pressure apply pump are both driven to discharge the brake fluid into the brake circuit and to regulate a fluid pressure of the brake fluid discharged into the brake circuit by the fluid-pressure control valve unit and to apply a desired braking force based on the regulated fluid pressure to desired road wheel regardless of presence and absence of depression of a brake pedal. A sump is disposed substantially midway in the pressure apply suction circuit between an inlet of the pressure apply pump and the brake fluid source, for storing a predetermined amount of brake fluid, so as to realize a high system response during vehicle dynamics control (during traction-and-yaw control). The pressure-apply discharge circuit and the pressure-apply circuit may be directly connected with each other to directly supply the brake fluid discharged from the pressure apply pump to the suction circuit of the return pump. More preferably, the automotive brake system may further comprise a pressure apply piston unit disposed between the pressure-apply discharge circuit and the pressure-apply circuit. The pressure-apply piston unit comprises a cylindrical housing, and a pressure-apply piston axially slidably accommodated in the cylindrical housing and dividing an internal space of the cylindrical housing into a pressure apply chamber and a pressure introduction chamber. The pressure apply chamber is connected via the pressure apply circuit to the suction circuit of the return pump, whereas the pressure introduction chamber is connected to the pressure-apply discharge circuit, so that brake fluid in the pressure apply chamber is directed to the suction circuit with a sliding motion of the piston when the discharge pressure is introduced from the pressure apply pump into the pressure introduction chamber. To ensure a satisfactory pressure-apply action, it is preferable that a volumetric capacity of the sump is set at a value greater than a change in volumetric capacity of the pressure introduction chamber, obtained by a maximum stroke of the piston. More preferably, the sump has a filter for removing contaminants from the brake fluid passing through the filter toward the inlet of the pressure apply pump. The filter may comprise a plurality of meshes, and the product of a mesh area of each of the meshes and the number of the filter meshes is greater than the minimum cross-sectional area of a fluid-flow passage of a first connection line constructing part of the pressure-apply suction circuit and disposed between the sump and the inlet of the pressure-apply pump. The automotive brake system may further comprise a relief circuit fluidly disposed between the pressure-apply discharge circuit and the sump and a relief valve disposed in the relief circuit, for returning the brake fluid within the pressure-apply discharge circuit to the sump by opening the relief valve when a pressure differential between a fluid pressure in the pressure-apply discharge circuit and a fluid pressure in the pressure-apply suction circuit exceeds a predetermined pressure level. It is preferable that a connection port of the relief circuit, connected to the sump, is formed in the housing away from a connection port of the first connection line connected to the sump, and located near a connection port of a second connection line constructing part of the pressure-apply suction circuit and interconnecting the sump and the brake-fluid source, and also the connection port of the relief circuit is positioned between the connection ports of the first and second connection lines. To enhance a filterability, it is preferable that the filter is disposed between the connection port of the relief circuit and the connection port of the first connection line.

DESCRIPTION OF THE PREFERRED EMBODIMENTS

Figure 1:
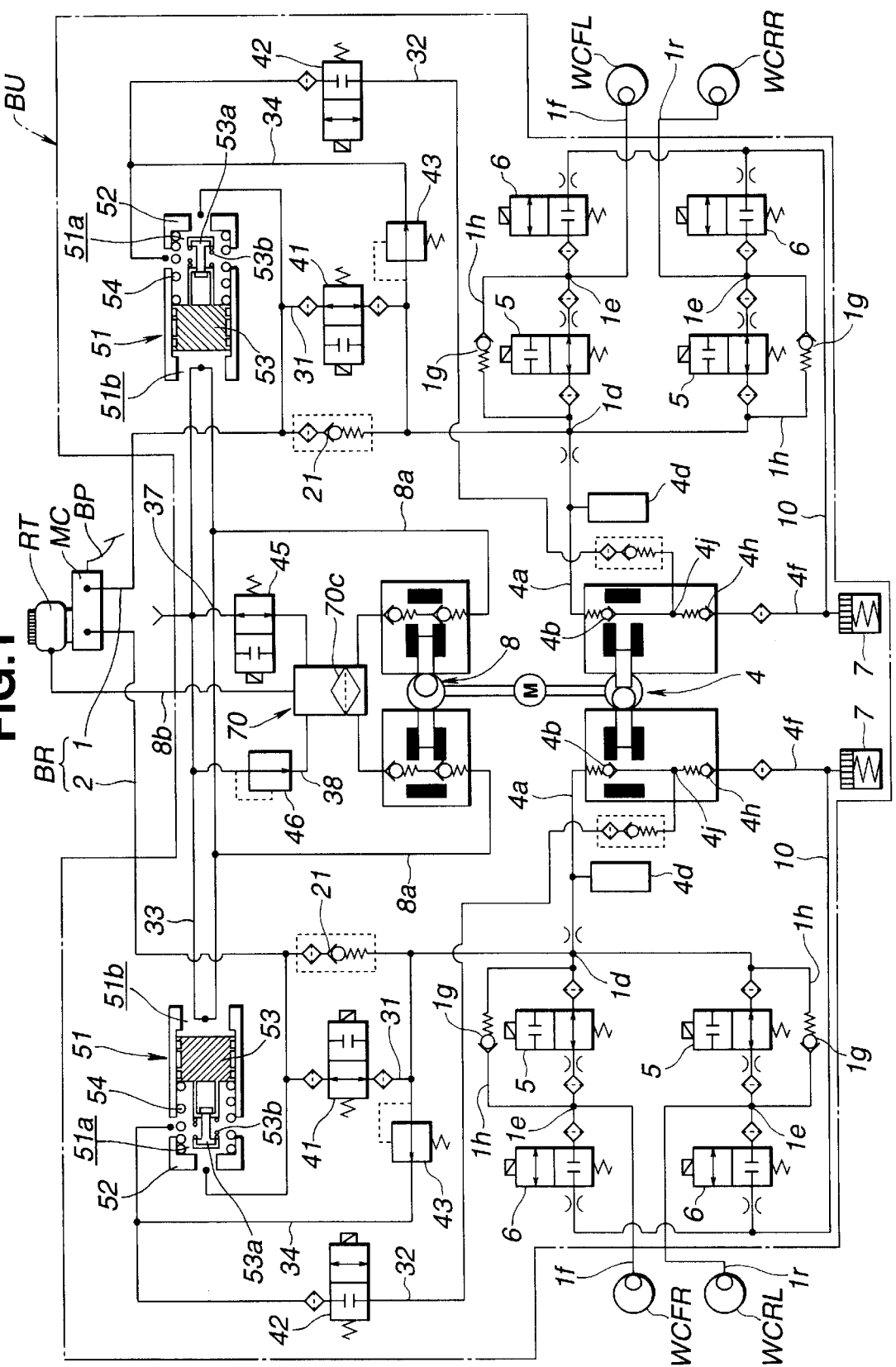
FIG. 1 is a hydraulic system diagram illustrating an embodiment of a computer-controlled automotive brake system according to the invention.

Referring now to the drawings, particularly to FIG. 1, the automotive brake control system of the invention is exemplified in an automotive vehicle with a divided and dual brake system. In FIG. 1, MC denotes a typical tandem master cylinder with two pistons, set in tandem. As can be seen in the hydraulic brake circuits shown in FIG. 1, as an example, the automotive brake system of the embodiment is applied to a diagonal split hydraulic brake system, often called a "X-split" brake system, each half serving a front road wheel on one side and a rear road wheel on the other side. One hydraulic brake circuit associated with both a front-left wheel-brake cylinder WCFL and a rear-right wheel-brake cylinder WCRR will be hereinafter referred to as a "first channel brake circuit", whereas the other hydraulic brake circuit associated with both a front-right wheel-brake cylinder WCFR and a rear-left wheel-brake cylinder WCRL will be hereinafter referred to as a "second channel brake circuit". In FIG. 1, the first and second channel brake circuits are denoted respectively by "1" and "2". The previously-noted master-cylinder MC, the first and second channel brake circuits 1 and 2 cooperate with each other to serve as a fluid-pressure generating source (or a fluid-pressure generating means) for the respective wheel-brake cylinders. In the embodiment, the master cylinder mechanically linked to the brake pedal BP is used as an essential element constructing the fluid-pressure generating means or the operating pressure generating means. Alternatively, the operating pressure for the respective wheel-brake cylinder may be generated by means of an external fluid pressure source and a computer-controlled pressure control valve unit which can properly regulate a brake-fluid pressure generated by the external pressure source in response to an electrical signal representative of the amount of depression of the brake pedal BP, and then deliver the regulated brake-fluid pressure to each individual wheel-brake cylinder. A tank unit RT, located above the tandem master cylinder MC, denotes a master-cylinder reservoir storing brake fluid (or working fluid). As seen in FIG. 1, to avoid repetition, only the structure of the first channel brake circuit (related to the wheels WCFL and WCRR) is hereinbelow described in detail, since the structure of the left-hand hydraulic brake circuit (the second channel brake circuit) is almost equal to the structure of the right-hand hydraulic brake circuit (the first channel brake circuit). As the brake pedal BP is depressed, the piston in the master cylinder MC applies pressure to the brake fluid. The pressure forces the brake fluid through one of two inlet/outlet ports of the tandem master cylinder MC via a front-left wheel-brake cylinder branch circuit $1f$ and a rear-right wheel-brake cylinder branch circuit $1r$ into the respective brake-wheel cylinders WCFL and WCRR, which will be generally referred to as the wheel cylinders WC. An inflow valve 5 and an outflow valve 6 are fluidly disposed in each of the branch circuits $1f$ and $1r$. As seen in FIG. 1, when the inflow valve 5 is de-activated, the inflow valve 5 is maintained at its spring-loaded position (corresponding to a full fluid-communication position) by way of a return spring (not numbered). When the inflow valve 5 is activated, the inflow valve 5 is shifted to its fully-closed position. The inflow valve 5 is comprised of a typical electromagnetically-controlled, two-port two-position directional control valve (a normally-open type electromagnetic solenoid valve). On the other hand, the outflow valve 6 is branched from the associated one of the branch circuits $1f$ and $1r$ at the branch point $1e$ (or the branch port) closer to the associated wheel-brake cylinder as compared with the inflow valve 5, and connected to an ABS reservoir 7 fluidly connected to the intermediate portion of an exhaust circuit (a return line) 10. When the outflow valve 6 is de-activated, the exhaust circuit 10 is shut off. When the outflow valve 6 is activated, the exhaust circuit 10 is fully opened and thus the brake fluid in the associated wheel-brake cylinder is directed via the outflow valve 6 and the exhaust circuit 10 into the suction port of a main pump (a return pump, often called an "ABS" pump) 4. As appreciated, the outflow valve 6 is also comprised of an electromagnetically-controlled, two-port two-position directional control valve (a normally-closed type electromagnetic solenoid valve). Located in the middle of each of the branch circuits $1f$ and $1r$, is an inflow-valve bypass line $1h$ with a one-way check valve $1g$. The bypass line $1h$ is arranged parallel to the inflow valve 5. The downstream end of the exhaust circuit 10 is connected to a main suction circuit $4f$ communicating with the suction port of the main pump 4. A suction-side one-way check valve $4h$ is fluidly disposed in the middle of the main suction circuit $4f$, for permitting the main pump 4 to suck in the brake fluid from the ABS reservoir 7 and for restricting back flow from the suction port of the main pump 4 to the ABS reservoir 7. The outlet port of the main pump 4 is connected via a discharge-side one-way check valve $4b$ into a main discharge circuit $4a$. The main discharge circuit $4a$ is connected to a connection point $1d$ (or a connection port) which is disposed upstream of the respective branch circuits $1f$ and $1r$ of the first channel brake circuit 1. A hydraulic element denoted by "$4d$" is a hydraulic damper which is connected to the main discharge circuit $4a$ for effectively absorbing undesired pulsation of the brake fluid discharged from the main pump 4. The main pump 4 has a driven connection with an electric motor M. The operation of the main pump 4, and the operation of the inflow valve set (5, 5) and the operation of the outflow valve set (6, 6) are properly controlled by means of an electronic control unit (ECU or simply CU) or an electronic control module (ECM), depending on vehicle operating conditions, such as a so-called deceleration slip (wheel lock occurring owing to excessive braking action), a so-called acceleration slip (wheel spin occurring at drive wheels owing to excessive driving torque applied to the drive wheels), or undesired vehicle behavior (containing excessive understeer or oversteer) about the z-axis in an earth-fixed axis system. The main pump 4, the inflow valves 5 and the outflow valves 6, and the ABS reservoir 7 construct an ABS unit. Assuming that a certain road wheel experiences wheel lock during braking, the inflow valve 5 (connected to the skidding less-traction wheel) is fully closed, and the outflow valve 6 (connected to the skidding less-traction wheel) is fully opened, and the ABS pump 4 is driven, in response to control commands from the electronic control unit CU, and thus the brake fluid in the wheel cylinder of the skidding less-traction wheel is directed through the outflow valve 6 toward the ABS reservoir 7. As a result, the wheel-cylinder pressure of the skidding less-traction wheel is reduced. The reduced wheel-cylinder pressure decreases the braking force applied to the skidding less-traction wheel, thus avoiding wheel lock. This operating mode is usually referred to as a "pressure reduction mode". Under these conditions, when the inflow valve 5 and the outflow valve 6 are both closed, the wheel-cylinder pressure is held constant. This operating mode is commonly referred to as a "pressure hold mode". With the inflow valve 5 and the outflow valve 6 kept closed, when the slip rate of the road wheel, which is subjected to the skid control, is less than a predetermined slip rate (essentially corresponding to an ideal slip rate), the inflow valve 5 is reopened and also the outflow valve 6 is closed, with the result that the working fluid discharged from the ABS pump 4 is directed via the inflow valve 5 to the wheel cylinder. In this manner, the wheel-cylinder pressure (the braking force) can be increased. This operating mode is usually referred to as a "pressure build-up mode". The previously-discussed three different operating modes are cyclically repeated. As a consequence, during the skid control, the ABS system partly releases the brakes, so that the wheels continue to rotate, however braking action continues. During the skid control, the braking torque is held to just below a so-called skidding point where a skid would begin. Therefore, the maximum braking effect can be obtained. During the previously-noted ABS control (the skid control), the main pump (the ABS return pump) 4 is continuously driven by the motor M, and the brake fluid temporarily stored in the ABS reservoir 7 is sucked in the inlet port of the main pump 4 and then discharged into the first channel brake circuit 1. A brake-circuit check valve 21 is fluidly disposed in the first channel brake circuit 1 upstream of the connection point 1*d*, for permitting brake-fluid flow from the upstream side of the first channel brake circuit 1 to the downstream side of the first channel brake circuit 1, and for restricting back flow therethrough toward the upstream side. Both ends of a bypass circuit 31 are connected to the first channel brake circuit 1, so that the bypass circuit 31 is arranged parallel to the brake-circuit check valve 21. A first gate valve (gate valve-OUT) 41 is fluidly disposed in the bypass circuit 31, bypassing the check valve 21. When the first gate valve 41 is de-energized, the first gate valve 41 is maintained at its spring-loaded position (corresponding to a full fluid communication position) by means of the spring bias of a return spring (not numbered) built in the first gate valve unit. On the contrary, when the first gate valve 41 is energized, the first gate valve 41 is maintained at its fully closed position with shifting motion of the electromagnetic solenoid slidably disposed in the first gate valve, and as a result the bypass circuit 31 is cut off. In the shown embodiment, the first gate valve is comprised of a typical two-port two-position electromagnetic directional control valve (a normally-open type electromagnetic solenoid valve). During the automatic braking action executed by the control unit CU, such as skid control, or traction-and-yaw control (vehicle stability control), the first gate valve 41 is electromagnetically closed in response to a control command (or an instruction signal) from the control unit CU, to prevent the controlled brake-fluid pressure from being transmitted to the master cylinder MC.

One end of a brake-fluid pressure apply circuit 32 is connected to a branch point 4*j* (or the branch port) located in the main suction circuit 4*f* between the suction port of the main pump 4 and the suction-side check valve 4*h*. The other end of the brake-fluid pressure apply circuit 32 is connected to a brake-fluid pressure apply chamber 51*a* of a brake-fluid pressure apply piston unit 51 fluidly disposed in the first channel brake circuit 1. A second gate valve (gate valve-IN) 42 is fluidly disposed in the middle of the first channel brake circuit 1. In the shown embodiment, a back-flow prevention check valve (not numbered) is also provided between the branch point 4*j* and the second gate valve 42. When the second gate valve 42 is de-activated, the second gate valve 42 is maintained at its spring-loaded position (corresponding to a shut-off position). When the second gate valve 42 is activated, the second gate valve is shifted to its valve full-open position. The second gate valve 42 is comprised of a typical two-port two-position electromagnetic directional control valve (a normally-open type electromagnetic solenoid valve). Details of the brake-fluid pressure apply piston unit 51 are described hereunder. The pressure apply piston unit 51 comprises a cylindrical piston housing (or a cylinder portion) 52 and a partitioning pressure-apply piston 53. The piston 53 is slidably accommodated in the cylinder portion 52, and acts to divide an internal space in the cylinder portion 52 into two chambers, namely a primary chamber 51*a* (or a pressure apply chamber) and a secondary chamber 51*b* (or a pressure introduction chamber). The pressure apply chamber 51*a* is connected to both the pressure apply circuit 32 and the first channel brake circuit 1. The piston 53 is spring-loaded by way of a return spring 54 in a direction that the pressure introduction chamber 51*b* is contracted. The piston 53 is formed at its left-hand end with a check valve 53*a*. The check valve 53*a* is supported by the piston 53, so that the check valve 53*a* is slidable axially. The check valve 53*a* is biased by way of a check spring 53*b* in a direction that the check valve 53*a* moves away from the piston 53. Thus, when the piston 53 slides by a predetermined stroke in an axially leftward direction that the piston 53 contracts the pressure apply chamber 51*a*, the check valve 53*a* serves to close off the left-hand opening of the pressure-apply piston unit 51, connected to the first channel brake circuit 1. At this time, assuming that the fluid pressure in the first channel brake circuit 1 becomes higher by a predetermined pressure differential as compared with the fluid pressure in the pressure apply chamber 51*a*, the check valve 53*a* shifts axially rightwards against the bias of the check spring 53*b*. As a result, the left-hand opening end of the pressure apply piston unit 51 opens. Under these conditions, when the piston 53 further slides axially leftwards and thus the check spring 53*b* is compressed fully, the check valve 53*a* remains fully closed. With such a full stroke of the piston 53, it is impossible to open the check valve 53*a*. In this manner, the check valve 53*a* operates in two different modes, namely a check enable mode which permits the brake-fluid flow from the first channel brake circuit 1 via the check valve 53*a* to the pressure apply circuit 32 depending on the pressure differential and the axial position of the piston 53, and a check disable mode at which the check valve 53*a* cannot provide any checking function. On the other hand, the pressure introduction chamber (the secondary chamber 51b) is connected to a loop shaped pressure introduction circuit 33. One end of a relief circuit 34 is connected to the connection line between the outlet port of the pressure apply piston unit 51 and the second gate valve 42. The other end of the relief circuit 34 is connected to the first channel brake circuit 1 just downstream of the check valve 21 and simultaneously connected to the downstream end of the bypass circuit 31. A relief valve 43 is disposed in the relief circuit 34. An external pilot port of the relief valve 43 receives the fluid pressure of the downstream side of the check valve 21 and the first gate valve 41, whereas the other port of the relief valve 43 receives the fluid pressure in the pressure apply circuit 32. When a pressure differential between the fluid pressure introduced into the external pilot port and the fluid pressure introduced into the other port exceeds the predetermined high pressure level, the relief valve 43 opens to relieve a part of the brake fluid in the first channel brake circuit 1 into the pressure apply circuit 32. The set pressure of the relief valve 43 is set at a predetermined high pressure level based on a master-cylinder pressure generated by the master cylinder MC during hard depression of the brake pedal. A brake-fluid pressure apply pump 8 applies pressure to the brake fluid in the pressure introduction circuit 33. The structure of the pressure apply pump 8 is similar to that of the previously-discussed main pump 4. The pressure apply action to the pressure introduction chamber 51b of the pressure apply piston unit 51 is achieved by at least the pressure apply pump 8. The pressure apply pump 8 has a pair of plungers each end of which is cam-connection with a single eccentric cam (not numbered) attached to the drive shaft of the motor M. The cam is driven by the same motor M whose output shaft is coaxially arranged with the cam of the main pump 4. When the cam is rotated by the motor M, the two plungers reciprocate in their axial directions, while keeping in cam-connection with the cam. Thus, each of the plungers provide a pumping action. The outlet port of the pressure apply pump 8 is connected to the pressure-apply discharge circuit 8a involving a discharge one-way check valve (not numbered) and also connected to the pressure-apply suction circuit 8b involving a suction one-way check valve (not numbered). The pressure introduction chamber 51b of the right-hand pressure apply piston unit 51 and the pressure introduction chamber of the left-hand pressure apply piston unit 51 are intercommunicated with each other through the loop shaped pressure introduction circuit 33. The downstream end of the pressure-apply discharge circuit 8a is connected via the pressure introduction circuit 33 to the pressure introduction chamber 51b. On the other hand, the upstream end of the pressure-apply suction circuit 8b is connected to the master-cylinder reservoir RT. Therefore, when the pressure apply pump is driven, the brake fluid in the reservoir tank RT is sucked and discharged into the pressure introduction circuit 33, and then supplied to the pressure introduction chamber 51b. As clearly seen in FIG. 1, note that a sump 70 is disposed substantially in the middle of the pressure apply suction circuit 8b and between the master-cylinder reservoir RT and the inlet ports of the pressure apply pump 8. Details of the structure of the sump 70 will be fully described later in reference to the system diagram shown in FIG. 2. The pressure introduction circuit 33 is connected to the sump 70 through both a brake fluid circulation circuit 37 and a relief circuit 38. Thus, the pressure introduction circuit 33 and the pressure apply suction circuit 8b are interconnected via the brake fluid circulation circuit 37 and also via the relief circuit 38 by providing the sump 70 in the middle of the pressure apply suction circuit 8b. In order to switch from a brake-fluid circulation mode to a working mode (or a pressure-apply mode), a circulation-mode switching valve 45 (or a circulation mode-select valve) is disposed in the brake-fluid circulation circuit 37. The brake fluid circulation circuit 37 ensures a brake-fluid circulation mode in which the pressure apply pump 8 does not work practically. As can appreciated from FIG. 1, the circulation switching valve 45 is comprised of a typical two-port two-position electromagnetic shut-off valve (a normally-open type electromagnetic solenoid valve). The opening and closing action of the circulation mode-select valve 45 is controlled in response to a control command (or an instruction signal) from the control unit CU. When the circulation mode-select valve 45 is de-energized, the brake-fluid circulation circuit 37 operates at the fluid circulation mode to permit circulation of brake fluid via the circulation circuit 37. When the circulation mode-select valve 45 is energized, the brake-fluid circulation circuit 37 operates at the working mode at which the pressurized brake fluid, discharged from the pressure-apply pump 8, is introduced into the pressure introduction chamber 51b and acts on the pressure apply piston 53. As will be fully described later, the circulation mode-select valve 45 is energized during the traction-and-yaw control. During normal braking or during skid control, the circulation mode-select valve 45 is de-energized. The relief valve 46 is fluidly disposed in the relief circuit 38, so that an external pilot port of the relief valve 46 receives the fluid pressure in the pressure introduction circuit 33 and the other port of the relief valve 46 receives the fluid pressure in the pressure-apply suction circuit 8b. The relief valve 46 serves as a low-pressure relief valve whose set pressure is a predetermined low-pressure level. When a pressure differential between the fluid pressure in the pressure introduction circuit 33 (corresponding to the fluid pressure in the pressure-apply discharge circuit 8a) and the fluid pressure in the pressure-apply suction circuit 8b exceeds the predetermined low-pressure level, the relief valve 46 opens to relieve the brake fluid in the pressure introduction circuit 33 into the pressure apply suction circuit 8b.

Figure 2:
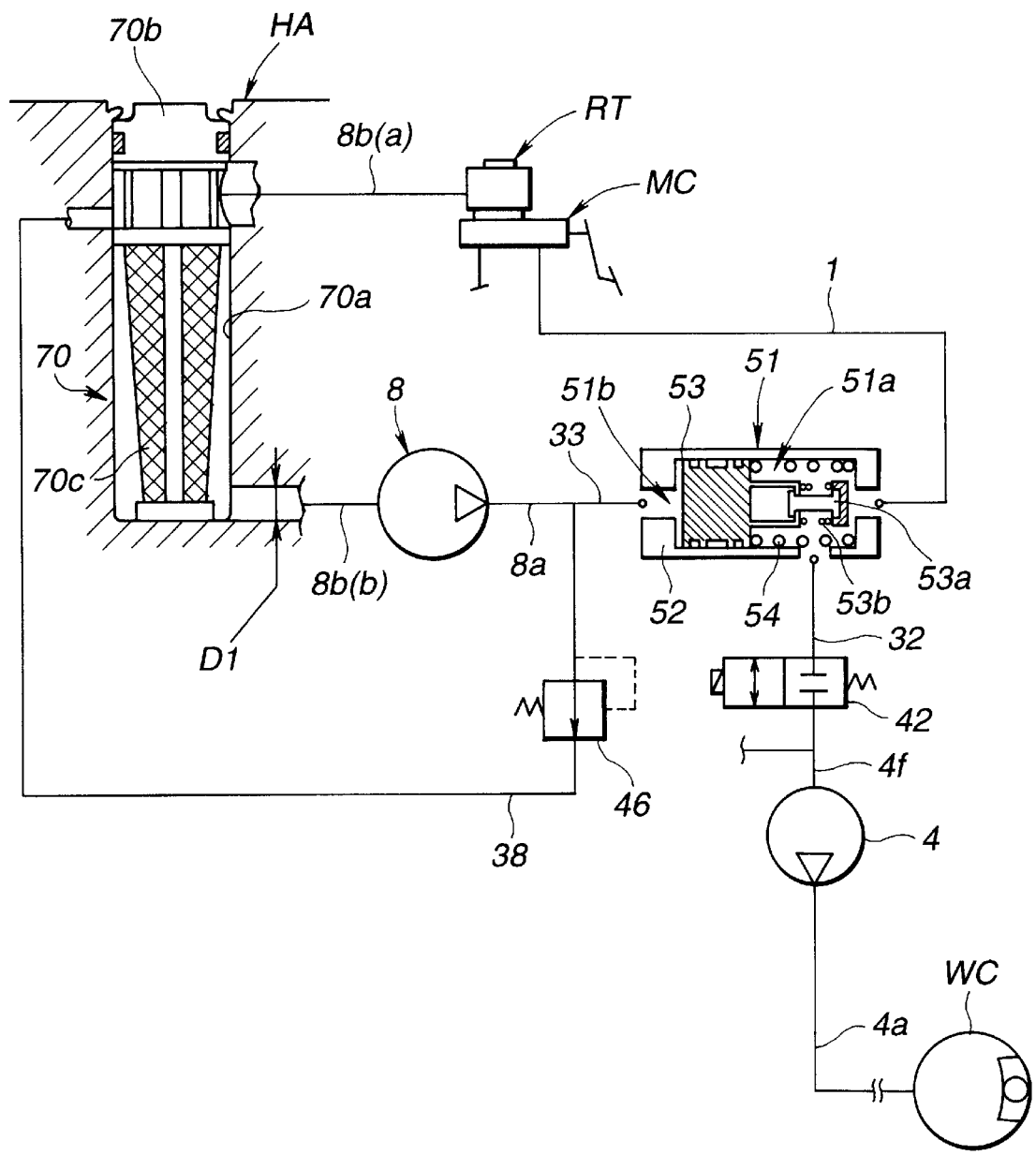
FIG. 2 is a hydraulic system diagram illustrating the essential part of the automotive brake system of the embodiment shown in FIG. 1, partly cross-sectioned.

Referring now to FIG. 2, there is shown the detailed structure of the sump 70. As seen in FIG. 2, the sump 70 comprises a sump hole 70a bored from one end face of a hydraulic module housing HA and a plug 70b tightly fitted into the opening end of the sump bore 70a to provide a tight seal. To prevent the plug from loosening, the plug is fixedly connected to the opening end of the sump bore 70a in a fluid tight fashion by caulking the peripheral portion of the opening end of the bore. The master-cylinder reservoir connected line 8b(a) of the pressure-apply suction circuit 8b opens into the upper portion of the sump hole 70a near the inside end face of the plug 70b. The pressure-apply pump inlet connected line 8b(b) of the pressure-apply suction circuit 8b opens into the bottom portion of the sump hole 70a. One end of the relief circuit 38 opens into the upper portion of the sump hole 70a at a slightly lower level as compared with the opening of the master-cylinder reservoir connected line 8b(a). The sump 70 also has a filter 70c through which the brake fluid sucked into the pressure-apply pump 8 passes to remove any impurities or contaminants from the brake fluid. The number of meshes constructing the filter 70c and a mesh area (an area of each of the filter meshes) are determined, so that the product of the mesh area and the number of filter meshes is greater than the cross-sectional area D1 of the pressure-apply pump inlet connected line 8b(b) of the pressure-apply suction circuit 8b. The cross-sectional area means the minimum fluid-flow passage area of the pressure-apply pump inlet connected line 8b(b). The volumetric capacity of the sump 70 is set to be slightly greater than the maximum volumetric capacity of the pressure introduction chamber obtained by the maximum stroke of the piston 53. Main components of the brake system of the embodiment, illustrated within one dotted line of FIG. 1, are integrally accommodated in the same housing HA and thus constructed as a sole brake unit HU. The brake unit BU is mounted in the engine room (not shown) in place.

Figure 3:
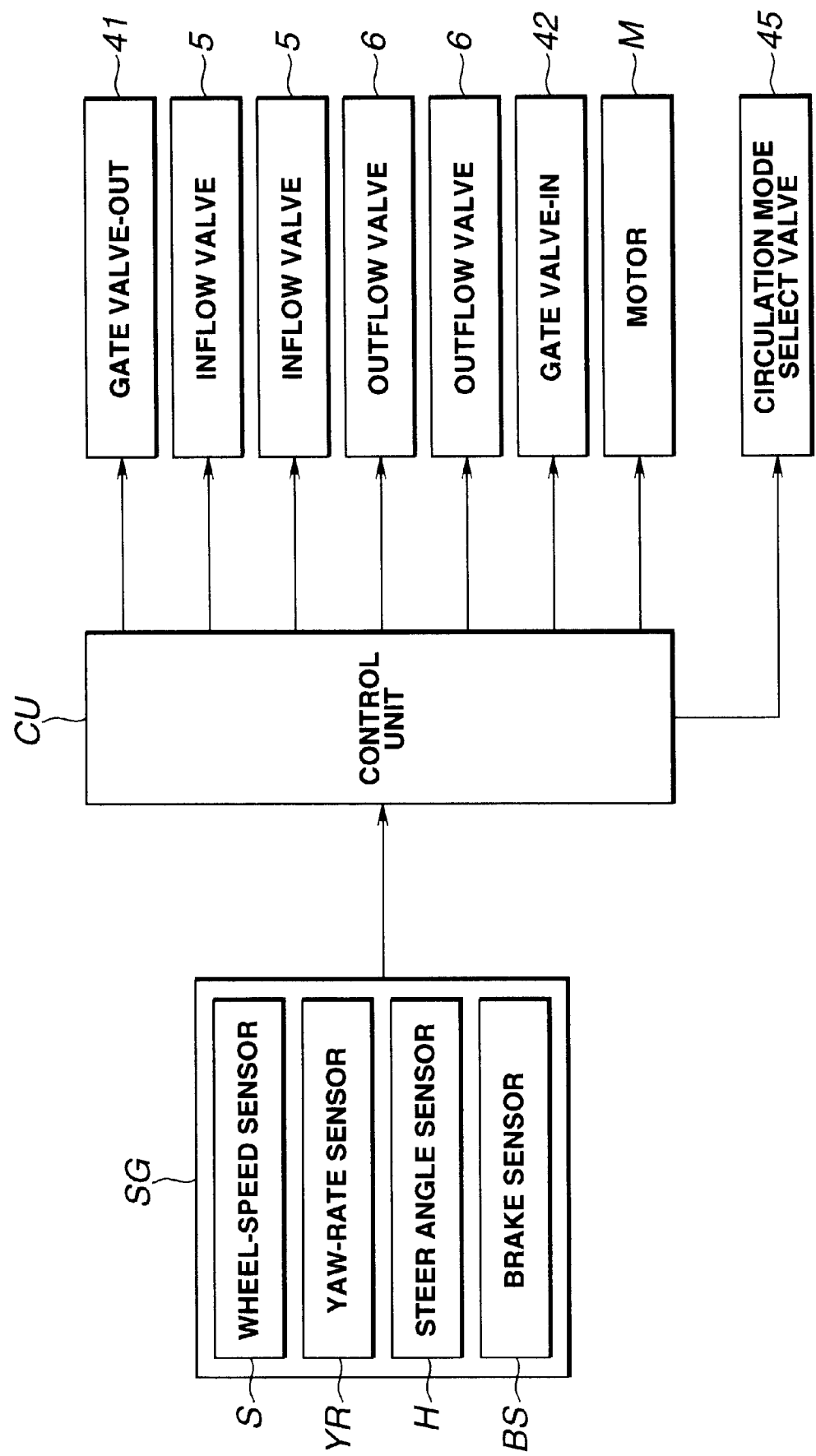
FIG. 3 is a block diagram illustrating a control circuit being applicable to the automotive brake system shown in FIG. 1.

Details of the control unit CU are explained hereunder by reference to the block diagram of FIG. 3.

Referring now to FIG. 3, the control unit CU functions to control the activating and de-activating of the motor M, and the opening and closing of each of the electromagnetic solenoid valves (5, 5), (6, 6), 41, 42 and 45. The electronic control unit CU is generally comprised of a microcomputer that is typical of that now in use many passenger cars and trucks. Although it is not clearly shown in FIG. 3, the control unit CU usually contains an input/output interface, a central processing unit (CPU), and a memory device (RAM/ROM). The input/output interface of the CU receives signals from a group of vehicle sensors SG, namely a wheel-speed sensor S, a yaw-rate sensor YR, a steer angle sensor H, and a brake sensor BS. The processor (CPU) of the control unit CU processes input information (the signals from the sensor group SG) in accordance with a pre-programmed task. The memory device (RAM/ROM) is designed to store data or programs, or to temporarily store the results of ongoing arithmetic calculations until they are required for use by the CPU. As seen in FIG. 3, the input/output interface of the control unit CU is also connected to the respective solenoid valves (5, 5), (6, 6), 41, 42 and 45, and the motor M, so as to properly control activation and de-activation of each of the solenoid valve and on and off operations of the motor M. The previously-noted wheel-speed sensor S is provided at each of road wheels, for sensing a wheel speed of each road wheel. The yaw-rate sensor YR is provided for monitoring a yaw rate or a yaw moment about the z-axis. The steer angle sensor H is provided for monitoring a steer angle of the vehicle. Usually, the brake sensor BS is a brake switch which generates a high-level signal (ON signal) when depressing the brake pedal BP, and generates a low-level signal (OFF signal) when the brakes are released. The control unit CU determines the presence or absence of braking action depending on a signal from the brake sensor BS. For example, when a value of the signal from the brake sensor BS is a high voltage signal, the control unit CU determines that the brakes are applied. Also, the control unit CU arithmetically calculates a slip rate of each of road wheels, based on signals from the various sensors SG. In a conventional manner, the control unit CU begins to execute skid control when the calculated slip rate of a certain road wheel exceeds a predetermined slip rate (corresponding to a pre-programmed threshold value), during braking. When the control unit CU compares the calculated slip rate to the pre-programmed threshold value and determines that the vehicle experiences a so-called acceleration slip at drive wheels during non-braking, the drive-wheel slip prevention control, often called "traction control" is initiated. Additionally, when the control unit CU compares the sensor signals from the sensor group SG with pre-programmed levels and determines that the vehicle loses directional stability for example during cornering, the control unit CU executes vehicle dynamics control, namely yaw control or vehicle stability control, to generate a yawing moment counteracting the undesired vehicle behavior (containing excessive understeer or oversteer) or undesired yaw rotation about the z-axis. During the skid control, during the traction control, or during the yaw control, the application and release of the solenoid valves (5, 5) and (6, 6) are processed to select a proper mode from the pressure-reduction mode, the pressure-hold mode, and the pressure build-up mode, and thus to ensure maximum effective braking (maximum vehicle deceleration) during braking and to prevent undesired wheel lock-up, or to prevent application of excessive driving torque to the driven wheels when accelerating, or to compensate for undesired steering characteristics (for example strong understeer or oversteer) towards neutral steer during cornering. Such a method for controlling or regulating a wheel-cylinder pressure is conventional and forms no part of the present invention, and thus details of the method for controlling the wheel-cylinder pressure are omitted. Actually, the activation of the main pump (the ABS return pump) 4 is necessary during the skid control. On the other hand, during the traction-and-yaw control, the activation of the main pump 4 and the activation of the pressure apply pump 8 are both necessary. In the shown embodiment, since the two pumps 4 and 8 have a driven connection with the same single motor M, these pumps 4 and 8 are driven simultaneously by the single motor M in response to the control command signal from the control unit CU. The automotive brake system of the embodiment operates as follows.

As seen in the right-half (the first channel brake circuit) of the brake system diagram shown in FIG. 2, the solenoid valves (5, 5), (6, 6), 41, 42 and 45 are usually maintained at their respective de-activated positions. Under these conditions, when the brakes are applied with the brake pedal BP depressed, the master-cylinder pressure is transmitted via each of the first and second channel brake circuits 1 and 2, that is, through the first gate valve 41 via the inflow valves 5 and the respective branch circuits 1f and 1r, into the wheel cylinders WC. Since the magnitude of the master-cylinder pressure increases, as the amount of depression of the brake pedal BP increases, the braking force applied to the road wheel is adjusted depending on the amount of depression of the brake pedal during normal braking. Thereafter, when the brakes are released, the brake fluid in the wheel-brake cylinders returns through the brake circuits 1 and 2 to the respective master-cylinder inlet/outlet ports in the reverse order of brake-fluid supply. During this brake-fluid returning action, the brake fluid is returned from the wheel-brake cylinders through the bypass circuit 31 to the master cylinder MC, because the brake-circuit check valve 21 operates to check the return fluid-flow via the corresponding brake circuit containing the check valve 21 to the pressure apply piston unit 51.

During braking, when the control unit CU determines, on the basis of the result of comparison between the calculated slip rate of each road wheel and the predetermined threshold level, that a road wheel is skidding or a skid starts to develop at a certain road wheel, the control unit CU executes skid control such that the slip rate of the skidding less-traction wheel is adjusted within the predetermined threshold level. As is generally known, during the skid control, the wheel-cylinder pressure control cycle containing at least the pressure-reduction mode, the pressure-hold mode, and the pressure build-up mode is repeated to prevent wheel lock-up and thus to ensure maximum effective braking. Assuming that the result of arithmetic calculation for a slip rate of a road wheel exceeds a first predetermined threshold during braking action, the control unit CU operates to activate the first gate valve 41 to maintain the valve 41 at its closed position. At the same time, the control unit CU begins to energize the motor M. On the other hand, the circulation mode-select valve 45 and the second gate valve 42 are held at their spring-loaded positions (the de-activated positions), that is, the circulation mode-select valve 45 is kept at its full-open position, whereas the second gate valve 42 is kept at its closed position. During the skid control, the control unit CU operates to activate both the inflow valve 5 and the outflow valve 6 of either the branch circuits 1r or 1f associated with the skidding less-traction wheel. Thus, this inflow valve 5 is shifted to the closed position, while this outflow valve 6 is shifted to the open position. With the outflow valve 6 fully opened, the brake fluid in the wheel-brake cylinder of the skidding less-traction wheel is exhausted through the exhaust circuit 10 into the ABS reservoir 7, with the result that the wheel-cylinder pressure of the skidding less-traction wheel is reduced effectively and a braking force applied to the skidding wheel is also reduced. The brake fluid exhausted into or temporarily stored in the ABS reservoir 7 is sucked via the main suction circuit 4f into the inlet port of the return pump 4, and then returned via the main discharge circuit 4a to the corresponding channel of the brake circuits 1 and 2. As a result of the pressure reduction mode, when the calculated slip rate of the road wheel, which is subjected to the skid control, will become below the first predetermined threshold, the control unit CU stops to activate the outflow valve 6 and continues to activate the inflow valve 5. Thus, the outflow valve 6 and the inflow valve 5 are both kept in their closed positions, to ensure the pressure-hold mode. During the pressure-hold mode, when the most recent arithmetic calculation data of the slip rate for the road wheel subjected to the skid control will become less than a second predetermined threshold different from the first predetermined threshold, the control unit CU operates to de-activate the inflow valve 5 and also to keep the outflow valve 6 at the closed position (the de-activated position), and as a result the inflow valve 5 is shifted to the full-open position with the outflow valve remaining closed. As a consequence, the brake fluid of the respective channel of brake circuits 1 and 2, being increasing at a high-pressure level, is directed via the inflow valve 5 into the wheel cylinder WC subjected to the skid control. This reincreases a braking force applied to the road wheel subjected to the skid control. In this manner, the cycle is repeated until the slip rate of the road wheel subjected to the skid control is adjusted within the predetermined slip-rate range. The brake-fluid pressure apply pump 8 as well as the return pump 4 are driven by way of the same motor M during the skid control, and that the circulation mode-select valve (the shut-off valve) 45 is simultaneously maintained at its full-open position. Therefore, during the skid control, the pressure apply pump 8 is operating at the brake-fluid circulating mode in which the brake fluid is circulating through the pressure apply pump 8, the pressure-apply discharge circuit 8a, the pressure introduction circuit 33, the brake fluid circulation circuit 37 and the pressure-apply suction circuit 8b, and additionally the pressure apply pump 8 itself scarcely acts as a load applied to the motor M. During the brake-fluid circulating mode, the pressure apply pump 8 does not work practically, and thus no fluid pressure or less fluid pressure is applied to the brake fluid in the pressure introduction chamber 51b. Under this condition, the pressure apply piston 53 is maintained at the spring-loaded position. The main pump 4 does not suck the brake fluid from the pressure apply circuit 32, since the second gate valve 42 is kept at the closed state during the skid control. Thereafter, when the driver releases the brakes and then the skid control ends, the control unit CU operates to de-activate the first gate valve 41 to establish fluid communication of each of the first and second channel brake circuits 1 and 2, and to return the inflow valves 5 and the outflow valves 6 to their initial positions (their spring-loaded positions) as shown in FIG. 1. As a consequence, the brake fluid in the wheel-brake cylinders returns through the hydraulic brake circuits 1 and 2 to the respective master-cylinder inlet/outlet ports in the reverse order of brake-fluid supply in the same manner as during normal braking. On the other hand, the brake fluid exhausted into and stored in the ABS reservoir 7 is returned via the associated one of the first and second channel brake circuits 1 and 2 to the master cylinder MC by virtue of pumping operation of the ABS return pump 4 for a predetermined brief moment which time period is pre-programmed in the ROM of the memory device of the control unit CU. As soon as the predetermined brief moment has been elapsed, the motor M is stopped, and thus the skid control terminates.

Additionally, the control unit CU can execute the so-called traction control (or the acceleration-slip suppression control) or the vehicle dynamics control containing the yaw control or the vehicle stability control. When rapidly starting or when quickly accelerating, the rate of acceleration-slip often exceeds a predetermined threshold level. In the event that the acceleration-slip rate exceeds the predetermined threshold during rapid start or during quick acceleration, the control unit CU initiates the traction control. On the other hand, when the vehicle loses directional stability on turns for example, the control unit CU executes the vehicle dynamics control so as to generate a yawing moment counteracting undesired vehicle behavior and to compensate for the yawing moment about the z-axis in a direction of stable vehicle behavior. The previously-noted traction-and-yaw control is executed depending on the control command signal from the control unit CU, irrespective of the presence or absence of depressing action of the brake pedal BP.

Details of the vehicle dynamics control or the traction-and-yaw control are described below.

During the vehicle dynamics control, the control unit CU operates to activate all of the circulation mode-select valve 45, the first and second gate valves 41 and 42, and the motor M. Thus, the first gate valve 41 (the gate valve-OUT) is kept in its closed position to block the first channel brake circuit, whereas the second gate valve 42 (the gate valve-IN) is kept in its open position to establish the pressure apply circuit 32. Simultaneously, the circulation mode-select valve 45 is shifted to its closed position (corresponding to the working mode position) to shut off the brake-fluid circulation circuit 37. The circulation of the brake fluid via the circulation circuit 37 is stopped by the circulation mode-select valve 45 closed. Under these conditions, at least the brake fluid stored in the sump 70 having a specified volumetric capacity as set forth above, is introduced into the pressure introduction chamber 51b at once. Thus, the piston 53 of the pressure apply piston unit 51 begins to slide, and then the brake fluid in the pressure apply chamber 51a is fed via the pressure apply circuit 32 into the main suction circuit 4f of the return pump 4. Thereafter, the return pump 4 sucks the brake fluid incoming from the pressure apply circuit 32, and then discharges the brake fluid via the main discharge circuit 4a into the first channel brake circuit 1. Depending on the controlled valve positions of the inflow valves (5, 5) and the outflow valves (6, 6), the wheel cylinder pressure is properly reduced, held, and built up to produce a desired braking force. In this manner, the vehicle attitude can be adjusted by way of the braking torque control or the yawing moment control. As set forth above, during the vehicle dynamics control (during the traction-and-yaw control), in the brake unit BU, the pressure apply pump 8 can suck, from the sump 70 provided near the pressure apply pump 8, a required amount of brake fluid necessary to operate the pressure apply piston unit 51. This ensures a high responsiveness of the pressure apply action of the pressure apply piston unit 51. As a consequence, a high-response vehicle dynamics control can be attained. During the pressure apply action, the brake fluid is re-supplied from the master-cylinder reservoir RT into the sump 70 to fill up brake fluid by a brake-fluid amount corresponding to the amount of brake fluid supplied to the pressure introduction chamber 51*b* of the pressure apply piston unit 51. If the pressure differential between the brake-fluid pressure in each of the brake circuits 1 and 2 and the brake-fluid pressure in the pressure apply circuit 32 will become above the predetermined high pressure level essentially corresponding to the set pressure of the relief valve 43 during the vehicle dynamics control, the relief valve 43 shifts to the full-open position, and thus the fluid pressure in the brake circuit (1, 2) is reduced to the set pressure of the relief valve 43 by relieving the high-pressure fluid into the pressure application circuit 32. In this manner, when part of the brake fluid in the brake circuit (1, 2) is returned via the relief valve 43 to the pressure apply circuit 32, the volumetric capacity of the pressure apply chamber 51*a* increases depending on the volume of brake fluid returned into the pressure apply circuit 32 with the sliding motion of the pressure apply piston 53 toward the spring-loaded position. During the vehicle dynamics control, if the pressure differential between the fluid pressure in the pressure introduction circuit 33 and the fluid pressure in the pressure-apply suction circuit 8*b* will become above the predetermined low pressure level essentially corresponding to the set pressure of the relief valve 46, the relief valve 46 opens, and thus part of the brake fluid in the pressure introduction circuit 33 is relieved through the relief circuit 38 toward the pressure-apply suction circuit 8*b*. As seen in FIG. 2, the relieved brake fluid circulates from the relief circuit 38 through the upper portion of the sump hole 70*a*, the filter 70*c*, the pressure-apply pump inlet connected line 8*b*(*b*) of the pressure-apply suction circuit 8*b*, the inlet port of the pressure apply pump 8, and the pressure-apply discharge circuit 8*a*, and is fed again into the relief circuit 38. Therefore, the fluid pressure in the pressure introduction circuit 33 (i.e., the fluid pressure in the pressure apply discharge circuit 8*a*) is maintained at or below the set pressure of the relief valve 46. Thus, the load applied to the pressure apply pump 8 is minimized. With the previously-noted arrangement of the sump, the brake fluid passing through the relief valve 46 must circulate via the filter 70*c* of the sump 70, and as a result impurities or contaminants contained in the brake fluid can be effectively removed. Also, the filter 70*c* is disposed between the two connection ports, namely an upper connection port of the relief circuit 38 connected to the sump 70 and a lower connection port of the connection line 8*b*(*b*) connected to the sump 70 and additionally the installation space of the filter 70*c* (the distance between these connection ports) is adequate to remove any contaminants from the brake fluid passing through the filter. This enhances a filterability of the filter within the sump 70. After this, when the vehicle dynamics control routine terminates, the control unit CU operates to de-activate all of the first gate valve 41, the circulation mode-select valve 45 and the motor M, so that the first gate valve 41 is shifted to the valve open position, the circulation mode-select valve 45 is shifted to the full-open position (the circulating mode position), and the motor M is stopped. As a result of shifting of the valves 41 and 45 and stopping of the motor M, there is no or less apply pressure applied to the fluid in the pressure introduction chamber 51*b* of the pressure apply piston unit 51. As a result, the piston 53 returns to the spring-loaded position. Additionally, the brake fluid returned from the wheel cylinders WC or from the return pump 4 into the channel brake circuit (1, 2) is returned into the pressure apply chamber 51*a*. Also, the brake fluid introduced into the pressure introduction chamber 51*b* is returned through the circulation mode-select valve 45 into the master-cylinder reservoir RT or into the sump 70.

As discussed above, in the brake system of the embodiment, the return pump 4 and the pressure apply pump 8 are both driven by way of a sole electric motor M, as a whole, the construction of the brake system is compact in size. Additionally, the pressure apply pump 8 and the fluid sump 70 supplying a required amount of brake fluid necessary for the pressure apply action are integrally accommodated in the same housing HA of the brake unit BU, and the distance between the sump 70 and the inlet of the pressure apply pump 8 is very short. Irrespective of the distance between the master cylinder MC and the brake unit BU (involving at least the pressure apply pump 8, the sump 70, and the pressure apply piston unit 51), the computer-controlled brake system of the embodiment ensures a high response during the vehicle dynamics control by way of the sump located near the pressure apply pump and due to the relatively short distance between the sump and the pressure-apply pump inlet. In addition, the brake unit BU, including the hydraulic circuits and hydraulic pumps and valves shown within the one-dotted line of FIG. 1, enhances the lay-out flexibility when installing the hydraulic brake control module in the engine room. That is, the brake system according to the present invention can balance the previously-discussed two contradictory requirements. Even during the cold weathers when brake fluid exhibits a high viscosity, the system of the invention insures a high responsiveness of traction-and-yaw control. Moreover, the essential components of the improved brake system having a plurality of superior effects are integrally constructed as a sole brake unit BU but not divided as a plurality of separated hydraulic brake units. This reduces total production costs of the system. Furthermore, the sole and compact brake unit BU may be easily installed on the vehicle (particularly in the engine room). This enhances the efficiency of installation of the hydraulic unit on the vehicle. As may be appreciated, during operation of the pressure apply pump 8, the brake fluid sucked into the pressure apply pump 8 has to pass through the filter 70*c* disposed in the sump 70 located at the entrance of the brake unit BU. This prevents entry of undesired impurities into essential hydraulic devices within the brake unit BU. The filter 70*c* is designed, so that the product of a mesh area and the number of filter meshes is greater than the cross-sectional area D1 of the pressure-apply pump inlet connected line 8*b*(*b*) of the pressure-apply suction circuit 8*b*. Therefore, the filter 70*c* does not act as an inflow resistance of working fluid (brake fluid) flowing toward the inlet of the pressure apply pump 8. Thus, when the pressure apply pump 8 operates at the brake-fluid circulation mode with the circulation mode-select valve 45 fully opened, the filter 70*c* of the sump 70 serves as less motor load. Also, as previously described, the relief circuit 38 is arranged parallel to the circulation circuit 37, and the relief valve 46 is disposed in the relief circuit 38. The fluid pressure in the pressure introduction circuit 33 (i.e., the fluid pressure in the pressure apply discharge circuit 8*a*) is maintained at or below the set pressure of the relief valve 46, even on the maximum stroke of the pressure apply piston 53. The provision of the relief circuit 38 and the relief valve 46 effectively prevents the increase of pump load. The sealing performance of each oil seal provided in the pump 8 is determined with due regard to the set pressure of the relief valve 46. That is, it is unnecessary to set the sealing performance of the oil seal disposed in the pump 8 at a high sealing level. This contributes to reduction of the total production costs. Furthermore, the opening end (the connection port) of the relief circuit 38 opening into the upper portion of the sump hole 70a is located at a somewhat lower level than the opening end (the connection port) of the master-cylinder reservoir connected line 8b(a) of the pressure-apply suction circuit 8b opening into the upper portion of the sump hole 70a. As a result, the slight level difference between the two different connection ports is effective to prevent the brake fluid relieved through the relief circuit 38 from undesiredly returning to the master-cylinder reservoir RT.

In the shown embodiment, the pressure apply piston unit 51 and the pressure apply pump 8 are utilized as a pressure-apply hydraulic module necessary for the traction-and-yaw control. In lieu thereof, the pressure-apply discharge circuit 8a of the pressure-apply pump 8 may be connected directly to the main suction circuit 4f. This eliminates the necessity of the pressure apply piston unit.

As will be appreciated from the above, in the brake system according to the invention, since a fluid sump is provided in the middle of a pressure apply circuit within a hydraulic module housing constructing an automotive hydraulic brake unit, the pressure apply pump can rapidly suck the brake fluid stored in the sump during vehicle dynamics control (yaw control or vehicle stability control), irrespective of the distance between the hydraulic brake unit and the fluid-pressure generating means (a master cylinder). Thus, the system of the invention ensures a high response during the vehicle dynamics control, while keeping enhanced design flexibility and enhanced lay-out flexibility. Also, a required amount of brake fluid necessary for the pressure apply action (or the full stroke of the pressure apply piston) can be temporarily stored in the simple sump located near the pressure apply pump, and thus the required amount of brake fluid can be effectively rapidly supplied from the sump into the pressure-apply pump inlet. This enhances the pressure-apply performance of the pressure apply piston unit, and remarkably enhances a responsiveness of the brake control system during the vehicle dynamics control. The provision of an oil filter in the sump is effective to remove any impurities from the brake fluid passing through the sump. In order to minimize the inflow resistance of brake fluid passing through the filter, meshes constructing the filter are properly dimensioned, so that the product of the number of filter meshes and the filter-mesh area is greater than a cross-sectional area of the connection passage between the sump and the inlet of the pressure apply pump. This prevents the pump load from increasing. Also provided is a relief circuit through which the pressure-apply discharge circuit is connected to the upper portion of the sump. This prevents the fluid pressure within the pressure-apply discharge circuit from unreasonably rising up to a pressure level higher than the set pressure of a relief valve disposed in the relief circuit. This prevents overloading the pressure apply pump, and thus enhances the durability of the pressure apply pump. The opening position of the relief circuit opening into the upper portion of the sump is located between the opening position of one connection line of the pressure-apply suction circuit opening into the upper portion of the sump and the opening position of another connection line of the pressure-apply suction circuit opening into the lower portion of the sump. This ensures smooth circulation of the brake fluid circulating through the relief circuit and the pressure apply pump. Moreover, within the sump 70, the filter 70c is located in the downstream side of the opening end of the relief circuit opening into the upper end of the sump bore. The brake fluid circulating through the relief circuit and the pressure apply pump is filtered to effectively remove any impurities or contaminants or debris contained in the brake fluid. The provision of the filter within the sump and a comparatively long filtering distance of the filter 70c assures a high filterability.

Figure 4:
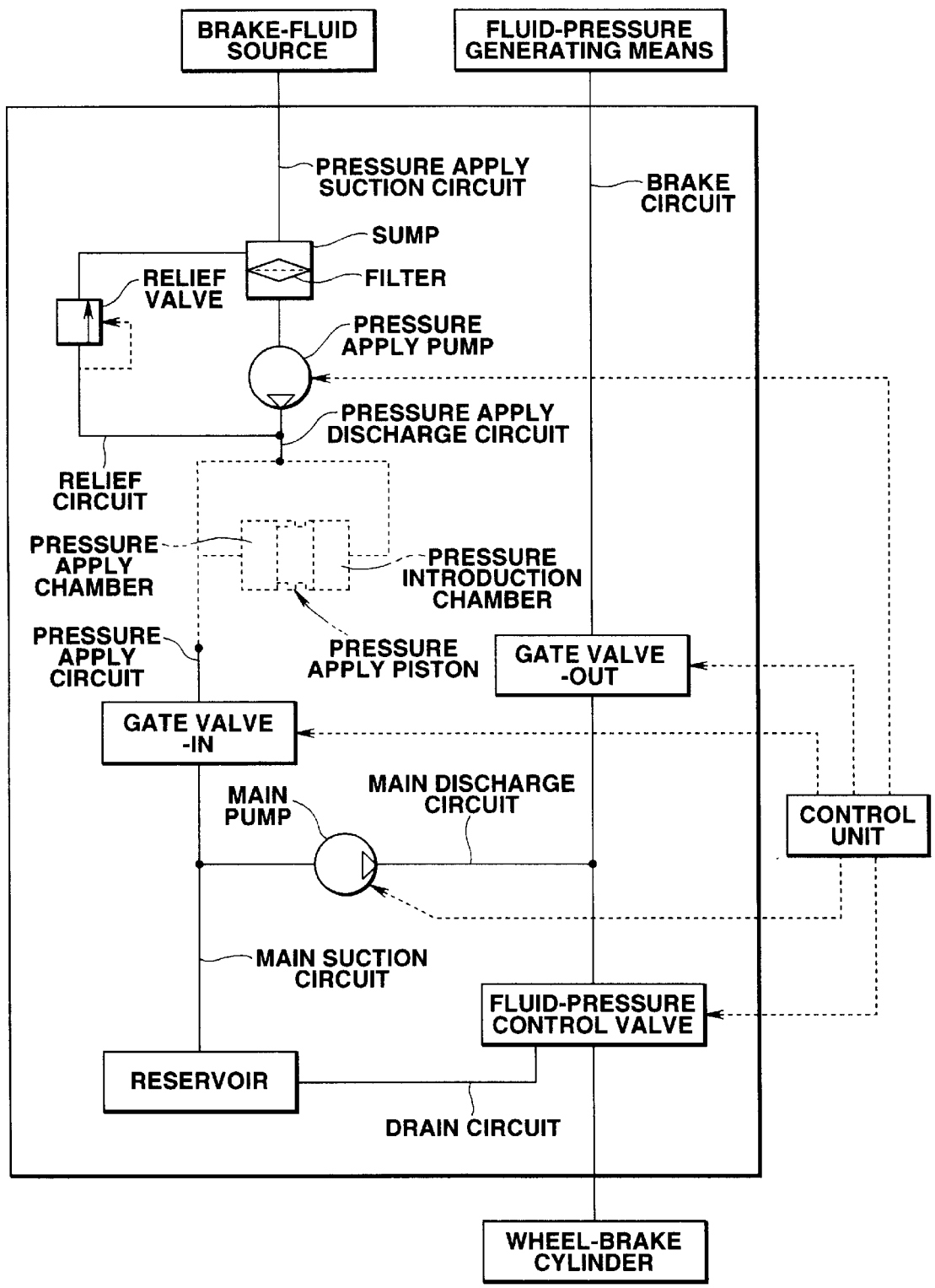
FIG. 4 is a schematic system diagram illustrating main component parts of the automotive brake system of the invention.

Referring now to FIG. 4, there is shown the fundamental concept of the brake system of the invention. As seen in FIG. 4, the brake system of the invention comprises a fluid pressure generating means (substantially corresponding to a master cylinder) capable of generating a brake fluid pressure depending on a depression amount of a brake pedal, a wheel-brake cylinder connected via a brake circuit to the fluid pressure generating means and capable of applying a braking force to the road wheel via the brake fluid pressure, and a hydraulic brake unit (or a hydraulic brake module). The hydraulic brake, unit is disposed in the middle of the brake circuit for regulating the brake fluid pressure in the wheel-brake cylinder. The hydraulic brake unit comprises a fluid-pressure control valve unit, usually constructed by a plurality of pressure control valves, to reduce, hold, and build up the wheel-cylinder pressure, a reservoir (substantially corresponding to an ABS reservoir) connected to a drain circuit through which the brake fluid is drained from the wheel-brake cylinder during a pressure-reduction mode, a return pump sucking the brake fluid stored in the reservoir from a main suction circuit and returning the brake fluid to the upstream side of the fluid-pressure control valve via a main suction circuit, a pressure apply pump sucking brake fluid from an external brake-fluid source via a pressure-apply suction circuit and discharging the brake fluid into a pressure-apply discharge circuit to provide a pressure apply action by way of which the brake fluid is fed from the pressure apply pump via a pressure apply circuit into the main suction circuit, a second gate valve (an inflow gate valve) opening and closing the pressure apply circuit, and a first gate valve (an outflow gate valve) disposed between the outlet port of the return pump and the port of the fluid-pressure generating means for opening and closing the brake circuit. The return pump, the pressure apply pump, the fluid-pressure control valves, and the first and second gate valves are integrally accommodated in a same housing. Also provided in a control unit for controlling all of the return pump, the pressure apply pump, the fluid-pressure control valves, and the first and second gate valves. The control unit is provided to stabilize vehicle attitude and to attain a proper vehicle dynamics control by producing a computer-controlled braking force (or a yawing moment counteracting undesired vehicle behavior or undesired yaw rotation) irrespective of the presence or absence of depression of the brake pedal. During the vehicle dynamics control, the second gate valve (the gate valve-IN) is kept in its open position, and the first gate valve (the gate valve-OUT) is kept in its closed position, and the return pump and the pressure apply pump are both driven to discharge the brake fluid into the brake circuit. Simultaneously, the discharge pressure of the brake fluid discharged into the brake circuit is properly regulated by means of the pressure control valves to create a desired braking force to be applied to a road wheel which is subjected to the vehicle dynamics control.

According to the invention, a fluid sump is disposed substantially midway in the pressure-apply suction circuit formed in the housing and located between the suction check valve of the pressure apply pump and the brake-fluid source, for storing a required amount of brake fluid necessary for the pressure apply action. Therefore, even if the brake unit is located away from the brake-fluid source, the brake system of the invention provides a high initial responsiveness of the vehicle dynamics control or vehicle stability control. As indicated by the solid line of FIG. 4, the above-discussed pressure-apply discharge circuit and the pressure apply circuit may be directly connected with each other without providing the pressure apply piston unit, so that the brake fluid discharged from the pressure apply pump is fed directly into the main suction circuit. In lieu thereof, as indicated by the phantom line of FIG. 4, in order to provide a more smooth pressure-apply action, it is preferable to dispose a pressure apply piston unit between the pressure apply discharge circuit and the pressure apply circuit. The pressure apply piston unit has a pressure apply piston dividing a piston chamber into a pressure introduction chamber and a pressure apply chamber. The pressure apply piston unit is designed, so that the piston slides axially when the discharge pressure is applied to the pressure introduction chamber by the pressure apply pump and the brake fluid in the pressure apply chamber is pushed out into the pressure apply circuit. The volumetric capacity of the sump is set to be greater than the volumetric-capacity difference between the minimum volumetric capacity obtained with the pressure apply piston held at its spring-loaded initial position and the maximum volumetric capacity obtained on the full stroke of the piston, so as to effectively and reliably store a required amount of brake fluid necessary for the full stroke of the pressure apply piston. The provision of the sump and the proper amount of brake fluid stored in the sump ensures a smooth pressure-apply action and thus a high responsiveness of the system can be attained. In the shown embodiment, the volumetric capacity of the sump is set at a value greater than 4.5 cc to assure the smooth pressure-apply action.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An automotive brake system comprising:
   a fluid-pressure generating device for generating a brake fluid pressure based on a magnitude of depression of a brake pedal;
   a wheel-brake cylinder being adapted to be attached to a road wheel for generating a braking force applied to the road wheel;
   a brake circuit connected between the fluid-pressure generating device and the wheel-brake cylinder;
   a hydraulic brake unit comprising:
      a housing;
      a fluid-pressure control valve unit fluidly disposed in the brake circuit and responsive to a control signal for operating at a selected one of three operating modes comprising a pressure reduction mode, a pressure-hold mode, and a pressure build-up mode to reduce, hold, and build up a wheel-cylinder pressure of the wheel-brake cylinder;
      a reservoir connected to a return line for temporarily storing brake fluid drained from the wheel-brake cylinder during the pressure reduction mode of the fluid-pressure control valve unit;
      a return pump operated in response to a control signal for returning the brake fluid stored in the reservoir via the return line to the brake circuit upstream of the fluid-pressure control valve unit;
      a pressure apply pump whose outlet is connected via a pressure apply circuit to a suction circuit of the return pump, the pressure apply pump operated in response to a control signal for performing a pressure apply action, so that the pressure apply pump sucks the brake fluid from a brake fluid source via a pressure apply suction circuit and discharges the brake fluid into a pressure apply discharge circuit, and thus supplies the brake fluid via the pressure apply circuit into the suction circuit of the return pump;
      a first gate valve disposed in the brake circuit between a discharge port of the return pump and the fluid-pressure generating device and operated in response to a control signal for opening and closing the brake circuit;
      a second gate valve disposed in the pressure apply circuit and operated in response to a control signal for opening and closing the pressure apply circuit; and
      the fluid-pressure control valve unit, the reservoir, the return pump, the pressure apply pump, the first and second gate valves being integrally accommodated in the housing;
   a control unit generating the control signals respectively transmitted to the fluid-pressure control valve unit, the return pump, the pressure apply pump, and the first and second gate valves, for executing at least vehicle dynamics control, so that, during the vehicle dynamics control, the second gate valve is opened, the first gate valve is closed, the return pump and the pressure apply pump are both driven to discharge the brake fluid into the brake circuit and to regulate a fluid pressure of the brake fluid discharged into the brake circuit by the fluid-pressure control valve unit and to apply a desired braking force based on the regulated fluid pressure to a desired road wheel regardless of presence and absence of depression of a brake pedal;
   and a sump disposed substantially midway in the pressure apply suction circuit between an inlet of the pressure apply pump and the brake fluid source, for storing a predetermined amount of brake fluid;
   wherein the pressure-apply discharge circuit and the pressure-apply circuit are directly connected with each other to directly supply the brake fluid discharged from the pressure apply pump to the suction circuit of the return pump; and
   a pressure apply piston unit disposed between the pressure-apply discharge circuit and the pressure-apply circuit, said pressure-apply piston unit comprising:
      a cylindrical housing; and
      a piston axially slidably accommodated in the cylindrical housing and dividing an internal space of the cylindrical housing into a pressure apply chamber and a pressure introduction chamber, the pressure apply chamber being connected via the pressure apply circuit to the suction circuit of the return pump, and the pressure introduction chamber being connected to the pressure-apply discharge circuit, so that brake fluid in the pressure apply chamber is directed to the suction circuit of the return pump with a sliding motion of the piston when the discharge pressure is introduced from the pressure apply pump into the pressure introduction chamber; and wherein a volumetric capacity of the sump is set at a value greater than a change in volumetric capacity of the pressure introduction chamber, obtained by a maximum stroke of the piston.

2. The automotive brake system as claimed in claim 1, wherein the volumetric capacity of the sump is set at a value greater than 4.5 cc.

3. The automotive brake system as claimed in claim 1, wherein the sump has a filter for removing contaminants from the brake fluid passing through the filter of the sump toward the inlet of the pressure apply pump.

4. The automotive brake system as claimed in claim 3, wherein the filter comprises a plurality of meshes, and a product of a mesh area of each of the meshes and a number of the meshes is greater than a minimum cross-sectional area of a fluid-flow passage of a first connection line constructing part of the pressure-apply suction circuit and disposed between the sump and the inlet of the pressure-apply pump.

5. The automotive brake system as claimed in claim 4, which further comprises a relief circuit fluidly disposed between the pressure-apply discharge circuit and the sump and a relief valve disposed in the relief circuit, for returning the brake fluid within the pressure-apply discharge circuit to the sump by opening the relief valve when a pressure differential between a fluid pressure in the pressure-apply discharge circuit and a fluid pressure in the pressure-apply suction circuit exceeds a predetermined pressure level.

6. The automotive brake system as claimed in claim 5, wherein a connection port of the relief circuit, connected to the sump, is formed in the housing away from a connection port of the first connection line connected to the sump, and located near a connection port of a second connection line constructing part of the pressure-apply suction circuit and interconnecting the sump and the brake-fluid source, and wherein the connection port of the relief circuit is positioned between the connection ports of the first and second connection lines.

7. The automotive brake system as claimed in claim 5, wherein the filter is disposed between the connection port of the relief circuit and the connection port of the first connection line.

8. An automotive brake system comprising:
  a fluid-pressure generating device for generating a brake fluid pressure based on a magnitude of depression of a brake pedal;
  a wheel-brake cylinder being adapted to be attached to a road wheel for generating braking force applied to the road wheel;
  a brake circuit connected between the fluid-pressure generating device and the wheel-brake cylinder;
  a hydraulic brake unit comprising:
    a housing:
    a fluid-pressure control valve unit fluidly disposed in the brake-circuit and responsive to a control signal for operating at a selected one of three operating modes comprising a pressure reduction mode, a pressure-hold mode, and a pressure build-up mode to reduce, hold, and build up a wheel-cylinder pressure of the wheel-brake cylinder;
    a reservoir connected to a return line for temporarily storing brake fluid drained from the wheel-brake cylinder during the pressure reduction mode of the fluid-pressure control valve unit;
    a return pump operated in response to a control signal for returning the brake fluid stored in the reservoir via the return line to the brake circuit upstream of the fluid-pressure control valve unit;
    a pressure apply pump whose outlet is connected via a pressure apply circuit to a suction circuit of the return pump, the pressure apply pump operated in response to a control signal for performing a pressure apply action, so that the pressure apply pump sucks the brake fluid from a brake fluid source via a pressure apply suction circuit and discharges the brake fluid into a pressure apply discharge circuit, and thus supplies the brake-fluid via the pressure apply circuit into the suction circuit of the return pump;
    a first gate valve disposed in the brake circuit between a discharge port of the return pump and the fluid-pressure generating device and operated in response to a control signal for opening and closing the brake circuit;
    a second gate valve disposed in the pressure apply circuit and operated in response to a control signal for opening and closing the pressure apply circuit; and
    the fluid-pressure control valve unit, the reservoir, the return pump, the pressure apply pump, the first and second gate valves being integrally accommodated in the housing;
  a control unit generating the control signals respectively transmitted to the fluid-pressure control valve unit, the return pump, the pressure apply pump, and the first and second gate valves, for executing at least vehicle dynamics control, so that, during the vehicle dynamics control, the second gate valve is opened, the first gate valve is closed, the return pump and the pressure apply pump are both driven to discharge the brake fluid into the brake circuit and to regulate a fluid pressure of the brake fluid discharged into the brake circuit by the fluid-pressure control valve unit and to apply a desired braking force based on the regulated fluid pressure to a desired road wheel regardless of presence and absence of depression of a brake pedal; and
  a sump disposed substantially midway in the pressure apply suction circuit between an inlet of the pressure apply pump and the brake fluid source for storing a predetermined amount of brake fluid;
  wherein the sump has a filter for removing contaminants from the brake fluid passing through the filter of the sump toward the inlet of the pressure apply pump; and
  wherein the filter comprises a plurality of meshes and a product of a mesh area of each of the meshes and a number of the meshes is greater than a minimum cross-sectional area of a fluid-flow passage of a first connection line constructing part of the pressure-apply suction circuit and disposed between the sump and the inlet of the pressure-apply pump.

* * * * *